Jan. 28, 1969    M. L. GREENBERG ET AL    3,424,022
HYDROSTATIC GEARING
Filed Jan. 23, 1967    Sheet _1_ of 3
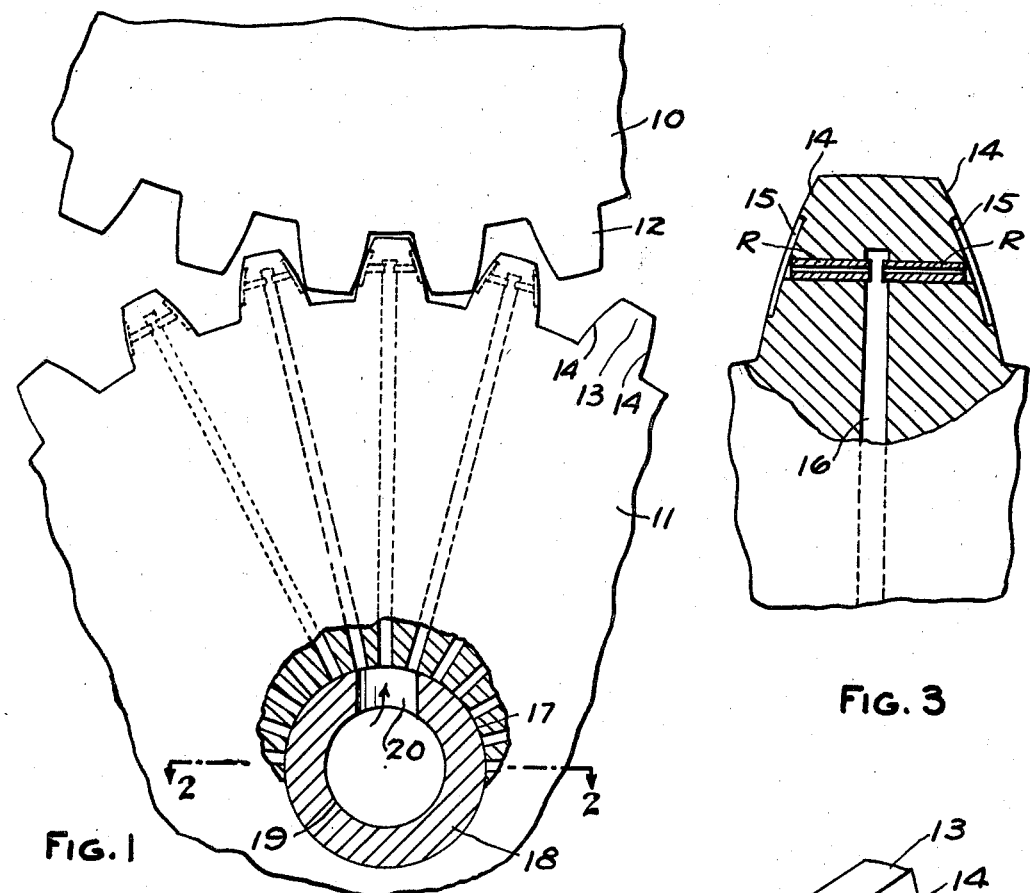
FIG. 3
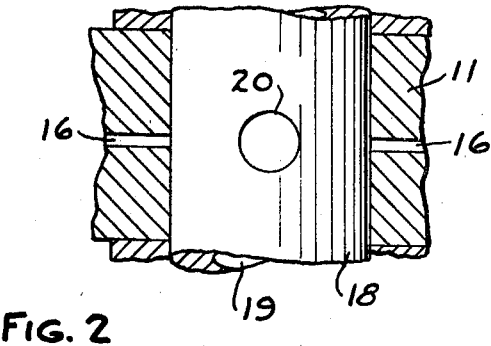
FIG. 1
FIG. 2
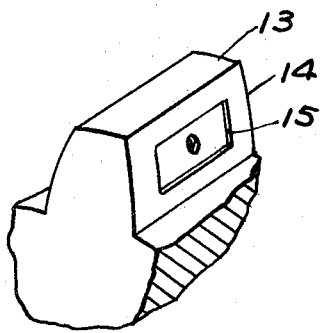
FIG. 4
FIG. 5
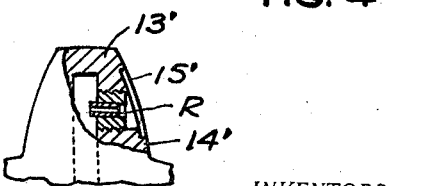
INVENTORS
MYRON L. GREENBERG
& GORDON H. PORATH
BY
Barnes, Kisselle, Raisch & Choate
ATTORNEYS

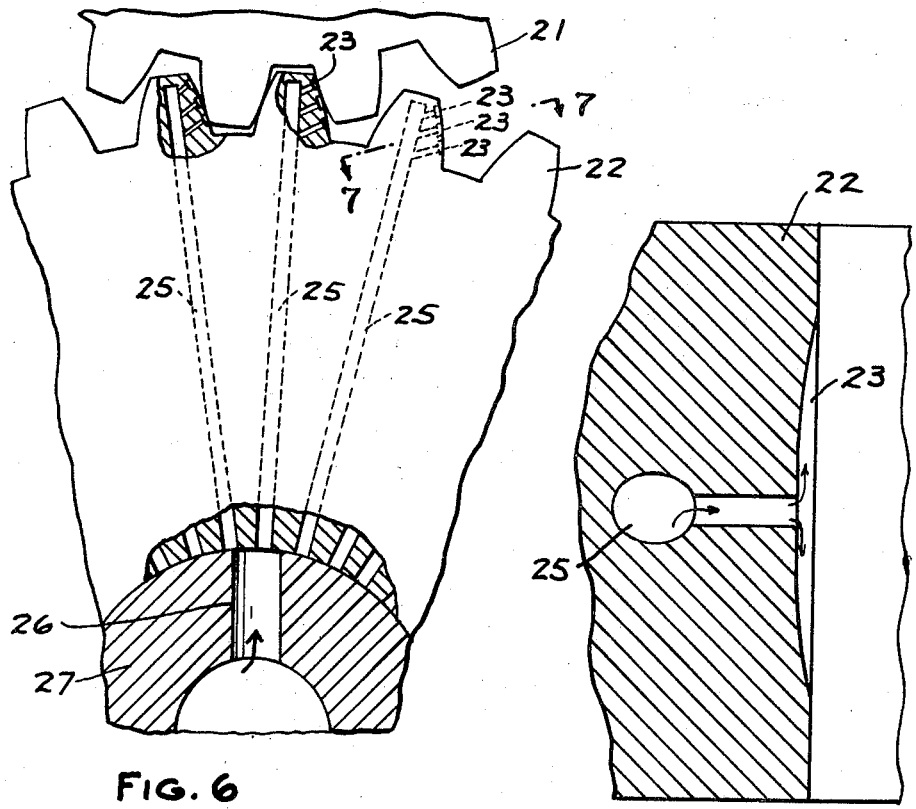
FIG. 6
FIG. 7
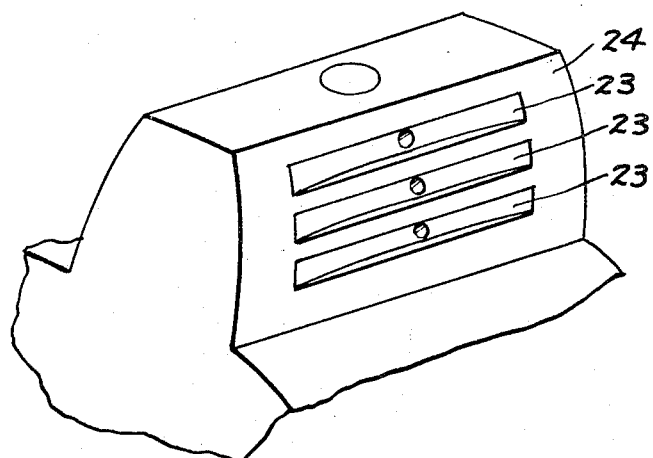
FIG. 8

INVENTORS
MYRON L. GREENBERG
& GORDON H. PORATH
BY
Barnes, Kisselle, Raisch & Choate
ATTORNEYS

United States Patent Office 3,424,022
Patented Jan. 28, 1969

3,424,022
HYDROSTATIC GEARING
Myron L. Greenberg, Union Lake, and Gordon H. Porath, Detroit, Mich., assignors to The Babcock & Wilcox Company, New York, N.Y., a corporation of New Jersey
Filed Jan. 23, 1967, Ser. No. 610,853
U.S. Cl. 74—409    8 Claims
Int. Cl. F16h 57/04, 57/00

ABSTRACT OF THE DISCLOSURE

The apparatus disclosed herein comprises gears with intermeshing teeth, the interengaging surfaces of at least one gear being formed with a plurality of pressure pads or recesses to which fluid under pressure is supplied through a restrictor. In one form, valving is provided to supply the fluid only to the interengaging surfaces. In another form, a plurality of pressure pads are provided on each surface. In another form, pressure pads are provided on the interengaging surfaces of both teeth. In a further form, pressure pads are provided only on one side surface of the teeth.

---

The invention relates to gearing particularly to the problem of friction and wear of gear teeth.

Background of the Invention

It is well known that one of the problems in connection with gearing of various types is that teeth tend to wear causing backlash, noise and resultant inaccuracy of movement of one gear relative to the other. Because of limitations with respect to the manufacture of gears, there is always some backlash even when the gears are new. In conventional gearing, some backlash is unavoidable since backlash is nothing other than what is conventionally known as clearance. Conventional gearing is such that a very small area of the teeth are in contact at any given time. This contact region comprises line or point contact with minimal area surrounding the contact region so that an extremely high unit pressure exists in the contact region. Since the forces are applied cyclically due to successive tooth engagement, the gear teeth are constantly in a condition of cyclic mechanical stress. This condition is particularly severe for large gearing.

Among the objects of the invention are to provide a gearing arrangement wherein the gear teeth are maintained in interengaging meshing relation, but there is no metal-to-metal contact with the teeth thereby obviating wear, noise and insuring accuracy and long life of the gears; wherein the load is distributed over a relatively greater area; wherein the load may be carried over more of the tooth face and wherein smaller gears may be used for a given load then have been heretofore used.

Summary

The invention disclosed herein comprises gears with intermeshing teeth, the interengaging surfaces of at least one gear being formed with a plurality of pressure pads or pockets to which fluid under pressure is supplied through a restrictor. In one form, valving is provided to supply the fluid only to the interengaging surfaces. In another form, a plurality of pressure pads are provided on each surface. In another form, pressure pads are provided on the interengaging surfaces of both teeth. In a further form, pressure pads are provided only on one side surface of the teeth.

Description of the drawings

FIG. 1 is a fragmentary part sectional view of gears embodying the invention.

FIG. 2 is a fragmentary sectional view taken along the line 2—2 in FIG. 1.

FIG. 3 is a sectional view through one of the teeth shown in FIG. 1.

FIG. 4 is a perspective view of the tooth shown in FIG. 3.

FIG. 5 is a part sectional view of a modified form of gear tooth.

FIG. 6 is a fragmentary part sectional view of a modified form of gearing.

FIG. 7 is a fragmentary sectional view taken along the line 7—7 in FIG. 6.

FIG. 8 is a fragmentary perspective view of the tooth shown in FIGS. 6 and 7.

Description

Figure 9:
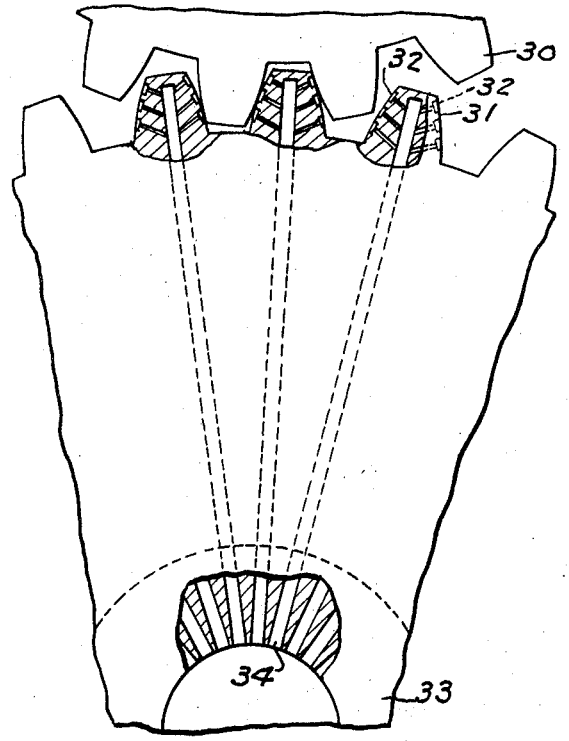
FIG. 9 is a fragmentary part sectional view of a further modified form of gearing.

Referring to FIG. 1, the invention is shown as applied to two spur gears 10, 11 having involute-shaped teeth. The teeth 13 on the gear 11 have side surfaces 14 formed with pressure pockets or pads 15. A restrictor or capillary R is associated with each pressure pad and a passage 16 extends from the restrictors to an opening 17 in the center of the gear into which a stationary cylindrical valve member 18 extends. Fluid under pressure is supplied through an opening 19 in the valve member 18 and a radial passageway 20. As the gear 11 is rotated, the fluid flows through passageway 20 and successively to passages 16. As shown, the circumferential extent of the passageway 20 is such that fluid is being supplied to three passages 16 simultaneously. In this manner, fluid such as oil is supplied to only the pressure pads 15 which are adjacent complementary surfaces of teeth 12, are about to interengage or just have interengaged with the surfaces of the teeth 12 in the other gear 10.

The fluid is supplied to the pressure pads 15 at substantially constant pressure and flows between the complementary surfaces of the teeth 12, 14 and thereby prevents direct metal-to-metal contact between the surfaces of the teeth. Any erratic loads on one gear relative to the other tends to increase the pressure existing in the corresponding pressure pad 15 thereby providing an increased force to prevent engagement and resultant metal-to-metal contact of the gear teeth. Accordingly, the rotation of the gears is achieved without wear, backlash or noise, resulting in long life and great accuracy.

A modified form of gear tooth 13' is shown in FIG. 5 and may be used where the gears are to be driven in one direction only. As shown, a sinple pressure pad 15' and associated restrictor R is provided on one face 14' only of the teeth.

In the form of the invention shown in FIG. 6, the intermeshing gear teeth 21, 22 are so arranged that a plurality of pressure pads 23 are provided on one face 24 of the teeth 22. Passages 25 extend radially to the center of the gear for communication with a passageway 26 of a valve 27 as in the previous form of the invention. In this form of the invention as in the form shown in FIG. 5, rotation of the gears is in one drection only. In other words, the pressure pads are placed on the surface of the teeth through which force is transmitted from one gear to the other.

In the form of the invention shown in FIG. 9, the intermeshing gear teeth 30, 31 are arranged so that rotation can occur in both directions. In order to achieve this, a plurality of pressure pads 32 and associated restrictors are provided on both interengaging surfaces of the teeth 31. In addition, in this form of the invention, the valve 27 of FIG. 6 is omitted and the hub 33 has radial passages 34 that extend to the pads and continuously supply fluid under pressure to all of the pads of the teeth. The pressure supplied to the passages 34 is sufficient to insure that the resultant pressure to the pads is adequate to provide the desired fluid film between the teeth 31, 32.

Figure 10:
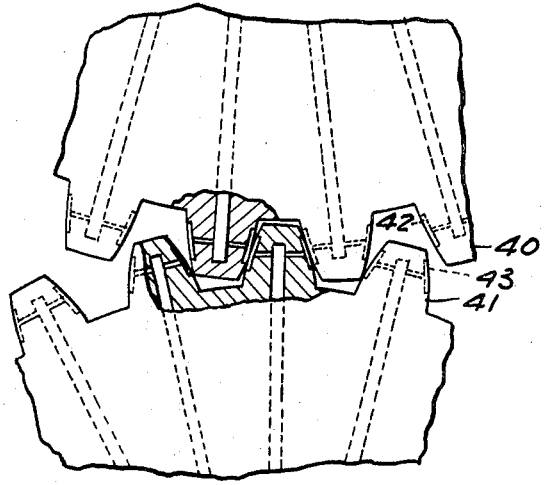
FIG. 10 is a fragmentary part sectional view of another form of gearing.

In the form of the invention shown in FIG. 10, the interengaging gear teeth 40, 41 are both provided with pads 42, 43 and associated restrictors on both surfaces thereof. In this form, fluid can be supplied to both sets of pressure pads simultaneously or alternately to one or the other. Such an arrangement has a distinct advantage where it is necessary to mix two liquids together in order to obtain the desired lubricating and pressure properties and such liquids cannot be pre-mixed. The arrangement also has an advantage where for manufacturing reasons only one or the other of the gears can have liquid supplied thereto.

Figure 11:
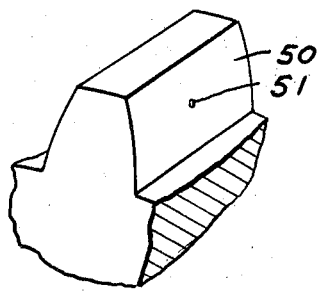
FIG. 11 is a fragmentary part sectional perspective view of a further form of gear tooth.

In the form of gear tooth shown in FIG. 11, the pressure pad or recess 51 comprises a passage which forms only a small part of the surface of the tooth 50.

Although the invention has been described in connection with only one form of gear teeth, it will become apparent in the light of the disclosure that it is applicable to other forms including helical, spiral, bevel, worm and rack and pinion. Where internal gears are used, an added advantage is achieved since more teeth are in engagement at any instant so that the loading on the teeth is less severe.

Although the invention has been described in connection with the use of a distributing valve, where there is adequate hydraulic supply, such a valve may be eliminated since the restrictors function to permit fluid at full pressure to be delivered to each pressure pad.

By utilizing a very viscous fluid, even greater advantages are achieved in that the fluid tends to fill the gap between the gear teeth as the gears successively mesh and further transmits the load over a greater effective area of the teeth faces.

I claim:
1. The combination comprising
   a first gear having an axis of rotation and having a plurality of circumferentially spaced teeth thereon,
   a second gear having an axis of rotation forming an angle with the axis of rotation of the first gear and having a plurality of circumferentially spaced teeth thereon,
   said teeth having interengaging surfaces,
   the surfaces of said teeth approaching one another from a distance as the gears are rotated,
   the interengaging surfaces of one of said gears being formed with at least one pressure recess,
   a restrictor associated with said recess,
   means for supplying fluid under pressure to said restrictors,
   valve means for controlling the flow of fluid substantially only to the pressure recesses which are in engagement so that a thin film of fluid flows between the surfaces of the interengaging teeth to provide a frictionless separation of the teeth as they are progressively intermeshed so that backlash, wear and noise are obviated.

2. The combination set forth in claim 1 wherein said valve means comprises a stationary member having a passage therethrough and a plurality of passages in said gear member extending to the pressure recesses and successively communicating with said passage in said valve member as the gear is moved relative to said valve member.

3. The combination set forth in claim 1 wherein each said tooth of said one gear has pressure recesses and associated restrictors on opposite side surfaces thereof.

4. The combination set forth in claim 1 wherein each said tooth has a plurality of pressure recesses on at least one side surface thereof.

5. The combination comprising
   a first gear having an axis of rotation and having a plurality of circumferentially spaced teeth thereon,
   a second gear having an axis of rotation forming an angle with the axis of rotation of the first gear and having a plurality of circumferentially spaced teeth thereon,
   said teeth having interengaging surfaces,
   the surfaces of said teeth approaching one another from a distance as the gears are rotated,
   the interengaging surfaces of each of said gears being formed with at least one pressure recess,
   a restrictor associated with each said recess,
   means for supplying fluid under pressure to said restrictors so that a thin film of fluid flows between the surfaces of the interengaging teeth to provide a frictionless separation of the teeth as they are progressively intermeshed so that backlash, wear and noise are obviated.

6. The combination set forth in claim 5 including means for controlling the flow of fluid substantially only to the pressure recesses of the surfaces which are in engagement.

7. The combination set forth in claim 5 wherein each sadi tooth of said one gear has pressure recesses and associated restrictor on opposite side surface thereof.

8. The combination set forth in claim 5 wherein each said tooth has a plurality of pressure recesses on at least one side surface thereof.

References Cited

UNITED STATES PATENTS

| 1,176,936 | 3/1916 | Waldon | 74—467 X |
| 1,502,083 | 7/1924 | Zoelly | 74—468 |
| 2,320,353 | 6/1943 | Ernst et al. | 74—467 X |
| 3,323,385 | 6/1967 | Revitt | 74—468 X |

FOREIGN PATENTS

| 276,275 | 7/1930 | Italy. |

DONLY J. STOCKING, *Primary Examiner.*

L. H. GERIN, *Assistant Examiner.*

U.S. Cl. X.R.

74—468, 410